Figure 1:
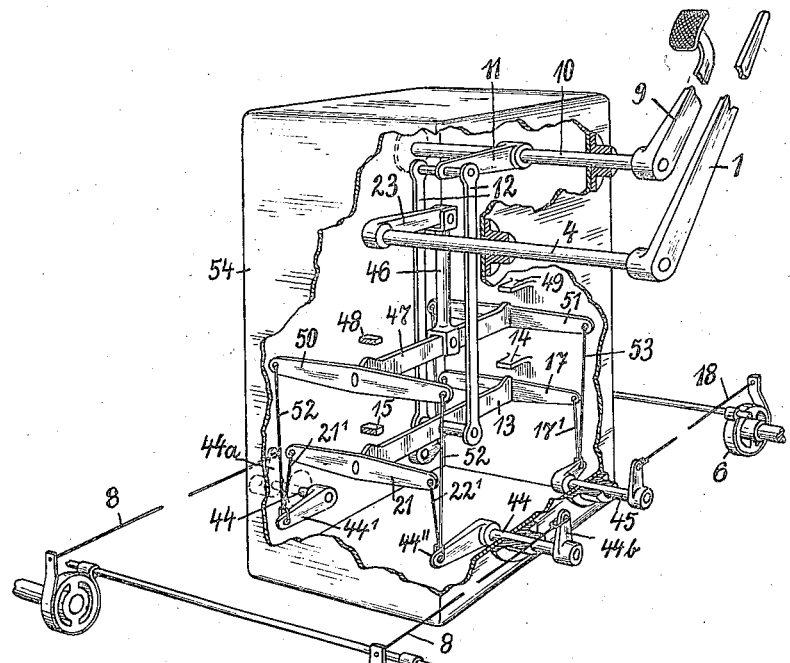

Oct. 2, 1923.

K. MAYBACH 1,469,232

VEHICLE BRAKE

Filed March 7, 1922

Inventor:
Karl Maybach

Patented Oct. 2, 1923.

1,469,232

UNITED STATES PATENT OFFICE.

KARL MAYBACH, OF FRIEDRICHSHAFEN, GERMANY, ASSIGNOR TO THE FIRM MAYBACH-MOTORENBAU GESELLSCHAFT MIT BESCHRANKTER HAFTUNG, OF FRIEDRICHSHAFEN A. B., GERMANY.

VEHICLE BRAKE.

Application filed March 7, 1922. Serial No. 541,830.

*To all whom it may concern:*

Be it known that I, KARL MAYBACH, a citizen of Germany, residing at Friedrichshafen a. B., Germany, have invented certain new and useful Improvements in Vehicle Brakes (for which I have filed applications in Germany October 1, 1919, June 30, 1921; Holland October 25, 1920), of which the following is a specification.

My invention relates to brake systems for vehicles and more particularly, motor vehicles. It is an object of my invention to provide a brake system which will act on all the wheels of the vehicle and is distinguished from other brake systems of the kind in that it requires but a single brake for each wheel, that it can be actuated both by a hand lever and a pedal lever and that, notwithstanding the connection of all the brakes acting on the several wheels,—say four—a fracture in the brake system does not render the brake inoperative, it being still possible to actuate the brake system, though, in the worst case, not all the brakes. So long as the system is in good working condition, all the brakes are applied uniformly and simultaneously so as to reduce wear and heating of the brake to a minimum.

This end is substantially effected by means of a compensating device having equalizing levers acting like the arms of a balance and fixed lugs arranged in the path of said levers in such a manner that, in case of a fracture in the braking system, one arm of the balancing lever concerned will abut against one of said lugs and there find a fulcrum.

In the drawings affixed to this specification and forming part thereof two embodiments of my invention are illustrated diagrammatically by way of example. In the drawings—

Fig. 1 is a perspective view of one embodiment of my invention, and

Figure 2:
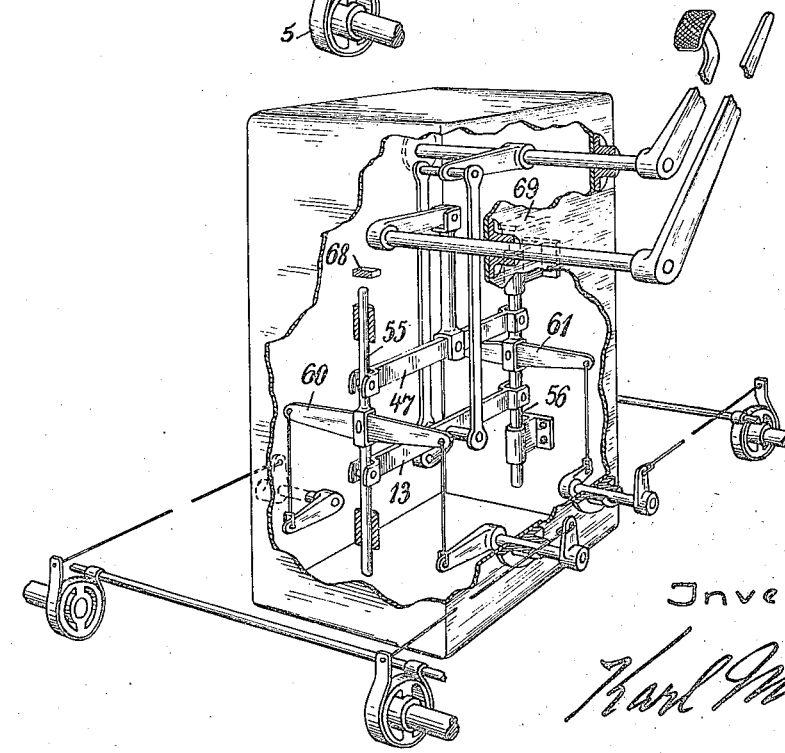

Fig. 2 a like view of another embodiment the principal parts of the brake system being enclosed in a common casing which is shown partly broken away.

Referring to Fig. 1 the hand lever 1 transmits its rotatory motion to a shaft 4. A lever 23 on the shaft 4 supports the fulcrum of an equally armed lever 47 by means of a rod 46. There are pivoted to the ends of the lever 47 balanced levers 50 and 51 which are capable of rocking in a plane at right angles to that in which the lever 47 rocks. The ends of the lever 50 are connected by tension elements 52, with levers 44' and 44'' at the inner ends of shafts 44 which are supported in bearings of the casing 54 and project from it on the outside where they are provided with arms 44$^a$ and 44$^b$, to which the tension elements 8 of the rear wheel brakes 5 are connected. A similar arrangement is provided in connection with the lever 51 to the ends of which tension elements 53 are attached to actuate shafts 45 by which the front wheel brakes 6 are actuated through the medium of the tension elements 18.

The pedal lever operates a shaft 10 supported in the casing 54 and on which is secured a lever 11 which by means of a pair of tension rods 12 carries the fulcrum of a balance lever 13 which, in a manner similar to that described with reference to lever 47, has transverse balance levers 17 and 21 pivoted at either end. Lever 17 is connected by means of tension elements 17' to the inner levers on the shafts 45 for the front wheel brakes and lever 21 is connected by traction elements 21' to the inner levers 44', 44'' of the shafts 44 for the rear wheel brakes. There are further arranged in the path of the levers 47 and 13 lugs 48, 49 and 14, 15 respectively which are so arranged as not to be engaged by the arms of their respective levers so long as the system is in working condition and operated in such.

If, on the operation of the pedal lever 9, a fracture occurs in one of the tension elements connected to the balance lever 21 or in any other part of the system which is arranged to the rear toward the rear wheel brakes, the balance lever 13 if the foot lever 9 is depressed with sufficient force, will abut against the lug 15 and, from this moment, act as a one armed lever on the front wheel brakes through the balance lever 17. The rear wheel brakes can be readily operated by the hand lever 1, and the brakes of all the wheels can also be operated by that lever.

An analogous operation takes place if one of the tension elements connected to the balance lever 17 breaks. In this case the lever 13 will abut against the lug 14.

In a similar manner which will appear from the drawings, and need not be described in detail, it is possible in case of a fracture in any of the parts connecting the hand lever 1 and the brakes for the rear wheels, to apply the brake to the front wheels by means of the hand lever 1 and to the front and rear wheels by means of the pedal lever 9.

Referring now to Fig. 2, the balance levers 50, 21 and 51, 17 of the device shown in Fig. 1 may be combined into lever 60 and 61, respectively, which levers are fulcrumed in connecting rods 55 and 56, respectively, each of which rods connects an arm of the balance levers 47 and 13. Obviously, the arms of said levers must, in this case, be equal in length. Here, two fixed lugs 68 and 69, disposed in the paths of the rods 55 and 56, respectively, will suffice.

I wish it to be understood that I do not desire to be limited to the exact details of construction shown and described, for obvious modifications will occur to a person skilled in the art.

I claim:

1. Brake-lever system for four wheeled vehicles comprising in combination, a pair of front brakes and a pair of rear brakes, two balance levers extending longitudinally of the vehicle, transverse balance levers carried by said longitudinal levers and connected with the front and the rear brakes, respectively, means for exerting a pull on said longitudinal balance levers and an abutment near each end of said longitudinal levers.

2. Brake-lever system for four wheeled vehicles comprising in combination, a pair of front brakes and a pair of rear brakes, two balance levers extending longitudinally of the vehicle, vertical rods connecting adjoining ends of said longitudinal levers, a transverse balance lever connected with each rod and having its free ends connected with a pair of brakes, means for exerting a pull on said longitudinal balance levers and an abutment near each end of said longitudinal levers.

3. Brake-lever system for four wheeled vehicles comprising in combination, a pair of front brakes and a pair of rear brakes, two balance levers extending longitudinally of the vehicle, vertical rods connecting adjoining ends of said longitudinal levers, means for guiding said rods, a transverse balance lever connected with each rod and having its free ends connected with a pair of brakes, means for exerting a pull on said longitudinal balance levers and an abutment near each end of said longitudinal levers.

In testimony whereof I affix my signature.

KARL MAYBACH.